United States Patent [19]

Cashler

[11] Patent Number: 5,418,722
[45] Date of Patent: May 23, 1995

[54] SIR DEPLOYMENT METHOD WITH ROUGH ROAD IMMUNITY

[75] Inventor: Robert J. Cashler, Kokomo, Ind.

[73] Assignee: Delco Electronics Corporation, Kokomo, Ind.

[21] Appl. No.: 205,464

[22] Filed: Mar. 4, 1994

[51] Int. Cl.$^6$ .................. B60R 21/16; B60R 21/22; B60R 21/32

[52] U.S. Cl. .............. 364/424.05; 340/669; 307/10.1; 280/735; 180/282

[58] Field of Search .............. 364/424.05; 340/436, 340/669; 307/10.1; 280/734, 735; 180/282, 274

[56] References Cited

U.S. PATENT DOCUMENTS

| | | | |
|---|---|---|---|
| 5,189,311 | 2/1993 | Moriyama et al. | 307/10.1 |
| 5,216,607 | 6/1993 | Diller et al. | 364/424.05 |
| 5,251,161 | 10/1993 | Gioutsos et al. | 364/424.05 |
| 5,282,134 | 1/1994 | Gioutsos et al. | 364/424.05 |

*Primary Examiner*—Kevin J. Teska
*Assistant Examiner*—Tyrone V. Walker
*Attorney, Agent, or Firm*—Mark A. Navarre

[57] ABSTRACT

A supplemental inflatable restraint system has a deployment algorithm which is enabled when a threshold acceleration is reached and then, based on subsequent measured acceleration data, determines whether and when to deploy an air bag. Rough road conditions produce accelerations which can enable the algorithm and then produce a reset event to terminate the algorithm. Reset events are each stored for a short time and the number of unexpired reset events is a measure of the rough road condition. The deployment calculation is adjusted to delay deployment for a time proportional to the number of reset events to allow gathering of additional acceleration data for the deployment decision.

10 Claims, 2 Drawing Sheets

SIR DEPLOYMENT METHOD WITH ROUGH ROAD IMMUNITY

FIELD OF THE INVENTION

This invention relates to a control method for deploying a motor vehicle supplemental inflatable restraint, and more particularly, to a control method having immunity to false deployment due to acceleration input arising from rough road conditions.

BACKGROUND OF THE INVENTION

In state-of-the-art supplemental inflatable restraint (SIR) systems, the decision to deploy an air bag is based on an estimate of the severity of a crash, as determined by an analysis of vehicle acceleration. Although a crash does result in large acceleration values, other sources of acceleration, especially rough road conditions, can also produce large acceleration values.

SIR algorithms use various boundaries or measures to determine if the air bag needs to be deployed. These boundaries and measures are set to only deploy on crash events, not rough road. Although a crash generally exhibits much larger vehicle acceleration than a rough road, there are some road conditions which generate accelerations close to crash conditions, and which, when multiplied by a factor of 2, as a standard immunity goal, cannot be reliably separated from high speed crashes using these boundaries and measures.

SUMMARY OF THE INVENTION

It is therefore an object of the invention to determine in a SIR system whether an event being measured is a rough road or a crash. Another object is to modify the method of determining deployment to prevent deployment as a result of rough road conditions.

The invention employs a specific measure to tell the SIR algorithm when an event being measured is a rough road. The algorithm can then use this information to prevent deployment. This specific measure is a history of recent enables or resets. In a crash event, as a result of measured acceleration reaching a threshold, an algorithm is enabled to calculate whether and when to deploy the air bag. After enablement, either deployment results or the algorithm is reset to await another enabling threshold. On a rough road an algorithm may be enabled or reset many times without reaching a determination that deployment is in order. By keeping track of recent enables and resets, a history is established which can indicate that the current event is part of a rough road sequence. If an event starts and no history of recent enables/resets is present, a crash is indicated. Thus deployment decisions are made using not only current data but the recent past history as well.

Recognizing that a crash can occur on a rough road, the rough road history indicator is complemented with measures which allow the algorithm to determine if, on a rough road, a crash has started. If a high acceleration inconsistent with rough road noise is measured, or the current event is continuing longer than expected for rough road noise, a crash is indicated instead of a mere rough road, and the history is disregarded.

To keep a deployment algorithm in readiness to respond to a crash when it is enabled even though the rough road history is present, it is adjusted to continue calculation of deployment parameters without causing deployment unnecessarily. For example, a brief time delay may be inserted during the calculations to enable additional acceleration data to be gathered and employed, yet the system remains poised to quickly deploy. If greatly increased acceleration occurs at that point deployment can be rapidly commanded, but if acceleration diminishes deployment can be further withheld or aborted.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

While the ensuing description is directed to a rough road immunity scheme incorporated in a particular air bag deployment method, it is believed to be advantageous for use with nearly any deployment algorithm. The particular deployment method is generally described below. Details are recited in the micro-controller based severity control disclosed in the co-pending U.S. patent application Ser. No. 08/157,512, filed Nov. 26, 1993, assigned to the assignee of the present invention, and incorporated herein by reference.

Figure 1:
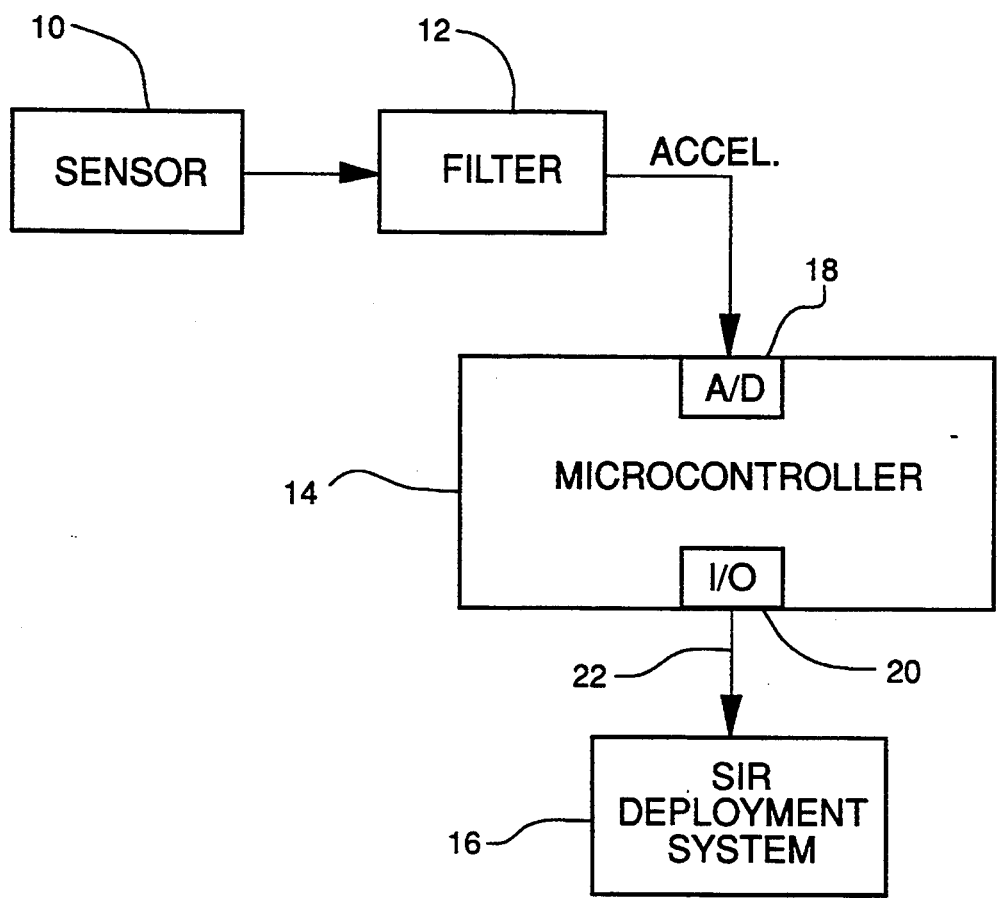
FIG. 1 is a system diagram of the SIR system.

FIG. 1 shows a SIR system comprising an accelerometer 10, a hardware low-pass filter 12, a micro-controller 14, and a SIR deployment system 16. The elements 10–16 may be generally conventional, except for the functionality of the micro-controller 14 under the direction of the control software described herein. Accelerometer 10 is rigidly mounted to a vehicle frame element (not shown) to provide an analog electrical signal corresponding to the acceleration, positive or negative, along the longitudinal axis of the vehicle. The acceleration signal is applied to filter 12 to form a filtered acceleration signal ACCEL, which is applied as an input to an A/D input port 18 of micro-controller 14 for analysis according to this invention and further according to previously known SIR methods. In addition to the A/D port 18 micro-controller 14 comprises conventional electronic componentry, including a microprocessor, random-access and read-only memories, and a suitable output port 20 for issuing a deployment command to the deployment system 16 when warranted by the acceleration signal analysis. Upon receipt of a deployment command on line 22, the deployment system 16 triggers air bag inflation to arrest the displacement of the vehicle occupants.

The micro-controller is programmed to sample the acceleration data, enable a deployment algorithm when acceleration reaches a certain threshold level, reset or disable the deployment algorithm if prescribed conditions occur, maintain an updated history of recent reset events, and adjust the deployment algorithm in accordance with the history in a manner to afford time to collect and evaluate additional acceleration data before issuing a deployment command. Typically the program is executed at 1 ms intervals so that for each loop through the program new acceleration data is sampled and processed and, if enabled, deployment calculations are updated.

Figure 2:
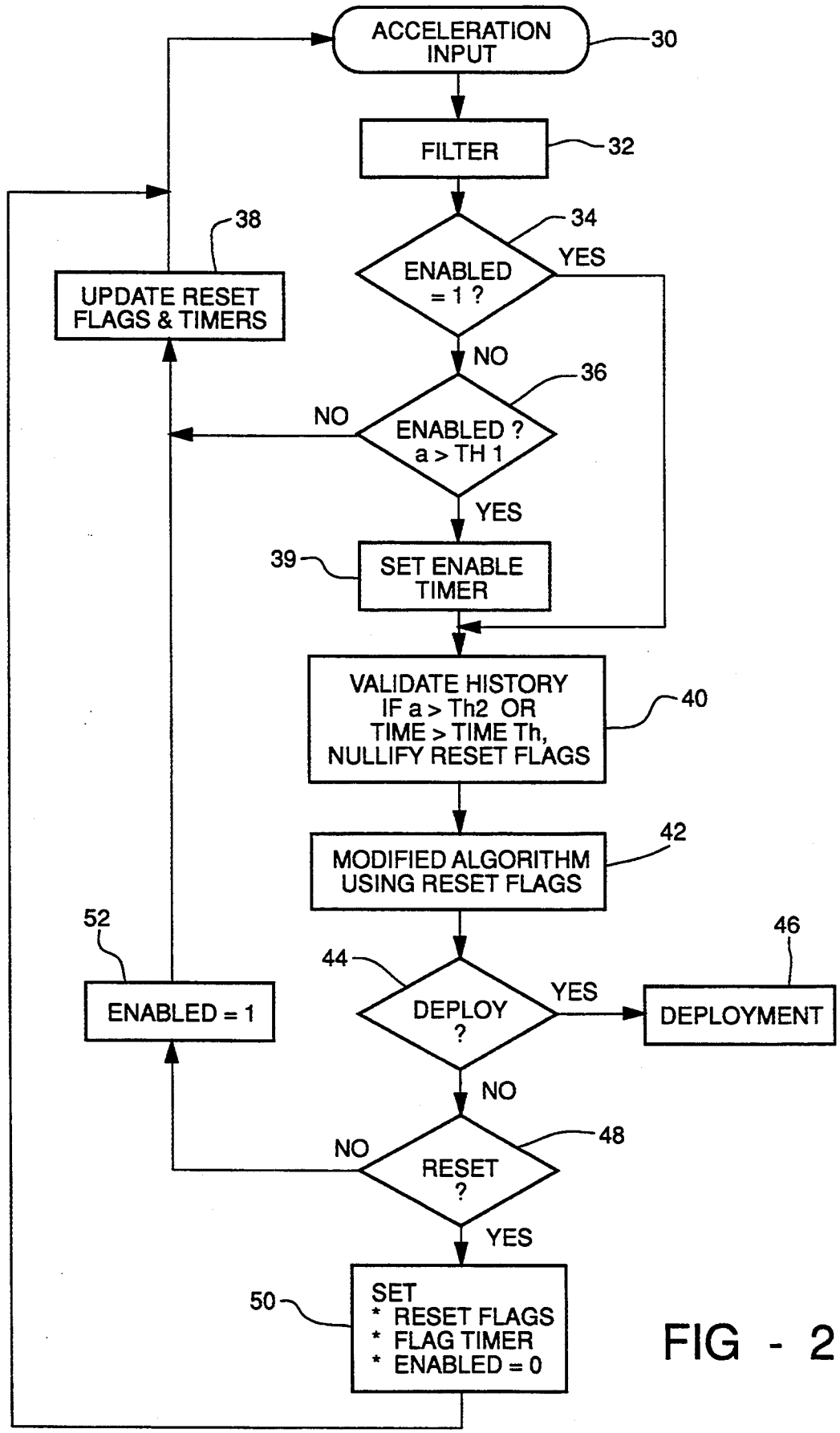
FIG. 2 is a flow chart illustrating the program methodology for the micro-controller of FIG. 1, according to the invention.

FIG. 2 is a flow chart representing the micro-controller program. Beginning with the acceleration input 30, acceleration samples are filtered in block 32. An ENABLED flag is tested in block 34; initially the flag will be zero. Then the acceleration sample is compared in block 36 with a threshold Th1 which is an acceleration value sufficiently high, say, 2 to 5 Gs, to indicate that a crash event is possibly beginning. If the threshold is not attained, the program returns to the acceleration input 30 via a flag and timer update block 38 which keeps the reset history current. If the threshold is attained in block 36 the deployment calculation is enabled, an enable timer is started in block 39 to measure the time elapsed since enablement, and the reset history is validated by block 40.

The block 40 validation includes two tests to verify that a history of recent resets is a valid indicator of rough road or if a crash event has superseded the rough road information. One test is that if the current acceleration sample is greater than a threshold Th2 which is set at a value higher than that which is attainable by rough road conditions. A severe crash will have very high G spikes of input acceleration. By themselves they are not sufficient information to command deployment. On the other hand, high G spikes are not present in rough road events and if seen, they indicate that this is no longer a rough road event and an actual crash is probable. The second test examines the enable timer to determine if the time elapsed since enablement is greater than a threshold. A rough road event is expected to enable and reset within about 20 ms and therefore if the time from enable attains 25 or 30 ms it is no longer considered to be a rough road event. If either test reveals that a crash is in progress, the reset history is ignored by the deployment calculation. On the other hand if RESET flags are present, no high G spikes are detected and the time from enablement is short, the current event is considered to be a continuation of the rough road environment.

After the validation, block 42 executes the calculation for deployment, one example of which is further discussed below. If a decision is made to deploy the air bag blocks 44 and 46 issue a deployment command. Otherwise, reset block 48 examines the available data to determine whether the crash event is continuing and thus whether the deployment calculation should continue. In the preferred embodiment there are three ways to reset; two of them are based on a measure called "predicted velocity at 100 ms." That is, using the current acceleration, the current accumulated velocity, and the time from enable, an estimate of velocity at 100 ms from enablement is made. The first reset test is that if after a minimum of 10 ms from enablement the predicted velocity at 100 ms is below a preset threshold such as 3 mph, reset is commanded. The second test requires that peaks of the predicted velocity be detected; if the current predicted velocity at 100 ms is a preset percentage below its last peak, reset is commanded. For example, if the percentage is set at 50% and the predicted velocity rises to 10 mph and then drops to 5 mph, the test is satisfied. The third reset test is via a heavily filtered value of acceleration: if that value reaches a first threshold, say, 3 G, and subsequently falls below a second lower threshold such as 2 G, reset is commanded. The first two tests, which are based on predicted velocity, are effective in resetting during rough road events shortly after enablement, and the third test is designed to reset the algorithm after the event has ended and no deployment was determined.

When a reset is commanded by block 48 block 50 sets a RESET flag and a corresponding flag timer, and sets the ENABLED flag to zero, and the program returns to the acceleration input with the program in its pre-enable state. Each time through the program loop the flag timer is updated at block 38 until a preset limit, typically 150 to 200 ms, is reached and the flag is cleared. If prior to the timer reaching its limit the block 36 again enables the algorithm, the RESET flag and its timer are maintained. If subsequently a second reset occurs while the first flag is still set, a second RESET flag is set and its timer is started. Up to four coexisting RESET flags are permitted, each with its independent timer. Thus block 38 effects storing the RESET flags in memory along with associated time values and clears each flag when its time expires. The number N of unexpired RESET flags in memory at a given time is the measure of rough road condition useful for adjusting the deployment calculation.

When block 48 does not determine a reset condition, block 52 sets the ENABLED flag to 1 and the program proceeds to block 38. In the succeeding loop, the block 34 will recognize the ENABLE flag and bypass the enable test in block 36 and the timer set in block 39.

Figure 3:
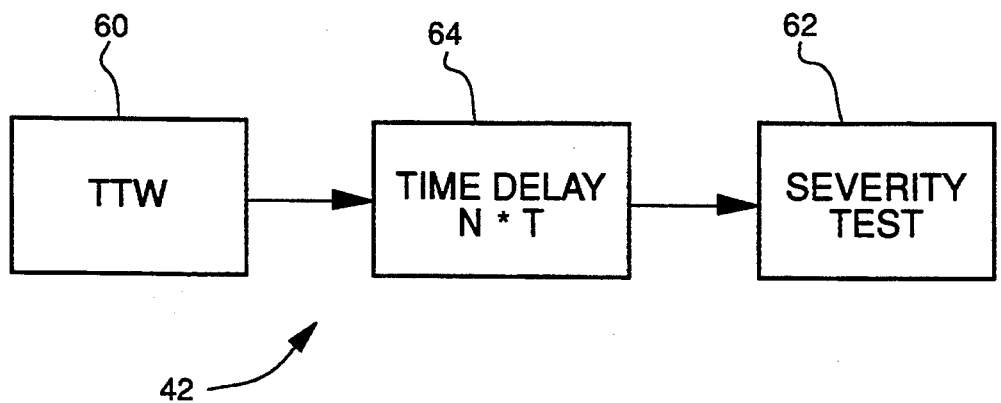
FIG. 3 is a flow-chart illustrating a portion of the FIG. 2 chart.

While other deployment algorithms may be used, the preferred deployment algorithm or calculation block 42 is shown more fully in FIG. 3. Deployment is calculated according to the above-mentioned patent application U.S. Ser. No. 08/157,512 in two stages, a time-to-wait (TTW) calculation (block 60) and a severity calculation (block 62). In the TTW step, the input acceleration ACCEL is integrated, averaged, and filtered to predict the occupant displacement a predetermined time in the future, where the predetermined time (30 ms) corresponds to the time required to inflate the air bag once a deployment command is issued. According to that application, as soon as the predicted occupant displacement reaches a threshold determined in relation to the desired occupant displacement at the time of inflation, the severity phase of the control (block 62) is initiated to estimate the effective vehicle velocity of the crash event at SIR inflation, referred to as effective velocity. If the effective velocity exceeds a predetermined threshold, the crash is severe enough to warrant deployment, and a deployment command is issued. An advantage to that two step approach is that compared to traditional deployment methods, the data gathering time is extended without exceeding the desired occupant displacement at the time of inflation, thereby permitting better decisions regarding crash severity.

According to the present invention, even more data gathering time is afforded during rough road conditions to allow additional improvement in decision making. A time delay (block 64) is inserted between the two stages 60, 62, the time delay being determined by the product of the number N of RESET flags in memory and a constant time increment T which may for example be 5 ms. Thus when there is some indication that the acceleration signals used in the TTW calculation are the result of rough road noise, a decision by the severity calculation to deploy is forestalled for a time, and the time delay is larger for a stronger rough road history as measured by the number of recent RESET flags. During the time delay the algorithm continues to collect more acceleration data prior to computing severity. As a result the algorithm could reset during the delay, additional immunity checks may take over at the end of the delay, or if the severity is finally computed it has the maximum amount of information available.

The embodiments of the invention in which an exclusive property or privilege is claimed are defined as follows:

1. A control method for deployment of a supplemental inflatable restraint in a motor vehicle comprising the steps of:
   measuring vehicle acceleration;
   initiating deployment calculation based on the measured acceleration when the measured acceleration exceeds a predetermined acceleration;
   deploying the supplemental inflatable restraint when the deployment calculation indicates an occurrence of a crash event;
   detecting a reset event indicative of a rough road condition;
   terminating the deployment calculation when a reset event is detected prior to deploying the supplemental inflatable restraint;
   storing a history of the detected reset events for a finite time; and
   upon subsequent initiation of the deployment calculation, modifying such calculation in accordance with the history of detected reset events so as to prevent false deployment due to the rough road condition.

2. The invention as defined in claim 1 wherein the step of modifying the deployment calculation comprises delaying the deploying of the supplemental inflatable restraint to permit additional acceleration measurement for use in the deployment calculation.

3. The invention as defined in claim 1 wherein:
   the step of storing a history of reset events comprises; activating a reset indication of predetermined duration in response to each detected reset event; and
   the step of modifying the deployment calculation comprises delaying the deploying of the supplemental inflatable restraint as a function of the number of active reset indications.

4. The invention as defined in claim 1 wherein:
   the step of storing a history of reset events comprises activating a limited number of reset indications of predetermined duration in response to the most recently detected reset events; and
   the step of modifying the deployment calculation comprises delaying the deploying of the supplemental inflatable restraint for a period which is proportional to the number of active reset indications.

5. The invention as defined in claim 3 including the step of deactivating the activated reset indications when the measured acceleration is indicative of a crash rather than rough road conditions.

6. The invention as defined in claim 3 including the step of deactivating the activated reset indications when the measured acceleration reaches a value significantly higher than acceleration values caused by rough road conditions.

7. The invention as defined in claim 3 including the steps of:
   measuring the time elapsed after each deployment calculation initiation; and
   deactivating the activated reset indications when the measured time becomes larger than a threshold time.

8. The invention as defined in claim 1 wherein the terminating step includes:
   calculating an average acceleration from the measured acceleration;
   repeatedly predicting a velocity for a given future time using the average acceleration;
   and if at a preset point prior to the given future time the predicted velocity is below a preset threshold, terminating the deployment calculation.

9. The invention as defined in claim 1 wherein the terminating step includes:
   calculating an average acceleration from the measured acceleration;
   repeatedly predicting a velocity for a given future time using the average acceleration;
   detecting peaks in the predicted velocity;
   and if the predicted velocity drops below the last peak by a determined amount, terminating the deployment calculation.

10. The invention as defined in claim 1 wherein the terminating step includes:
    filtering the measured acceleration;
    and when the filtered acceleration attains a first threshold and then drops to a smaller threshold, terminating the deployment calculation.

* * * * *